United States Patent
Baert et al.

(10) Patent No.: US 10,961,722 B2
(45) Date of Patent: Mar. 30, 2021

(54) WATERPROOF PANEL, PROCESS FOR PRODUCING A PANEL, AND PANEL OBTAINABLE BY SAID PROCESS

(71) Applicant: CHAMPION LINK INTERNATIONAL CORPORATION, The Valley (AI)

(72) Inventors: Thomas Luc Martine Baert, Sint-Martens-Latem (BE); Anthony Drevet, Zhejiang (CN); Tom Van Poyer, Zhejiang (CN)

(73) Assignee: CHAMPION LINK INTERNATIONAL CORPORATION, The Valley (AI)

( * ) Notice: Subject to any disclaimer, the term of this patent is extended or adjusted under 35 U.S.C. 154(b) by 0 days.

(21) Appl. No.: 16/075,239

(22) PCT Filed: Nov. 17, 2016

(86) PCT No.: PCT/EP2016/078010
§ 371 (c)(1),
(2) Date: Aug. 3, 2018

(87) PCT Pub. No.: WO2017/133804
PCT Pub. Date: Aug. 10, 2017

(65) Prior Publication Data
US 2019/0040635 A1    Feb. 7, 2019

(30) Foreign Application Priority Data

Feb. 4, 2016 (NL) ..................................... 2016223

(51) Int. Cl.
| | | |
|---|---|---|
| *E04F 15/10* | (2006.01) | |
| *B32B 37/04* | (2006.01) | |
| *B32B 37/15* | (2006.01) | |
| *E04F 13/077* | (2006.01) | |
| *E04F 13/08* | (2006.01) | |
| *E04F 15/02* | (2006.01) | |
| *B32B 27/08* | (2006.01) | |
| *B32B 27/18* | (2006.01) | |

(Continued)

(52) U.S. Cl.
CPC ............ *E04F 15/107* (2013.01); *B32B 27/08* (2013.01); *B32B 27/18* (2013.01); *B32B 27/304* (2013.01);
(Continued)

(58) Field of Classification Search
CPC .............. E04F 15/107; E04F 15/02183; E04F 15/02188; E04F 13/077; E04F 13/0871;
(Continued)

(56) References Cited

U.S. PATENT DOCUMENTS

| | | | |
|---|---|---|---|
| 8,215,078 B2 * | 7/2012 | Pervan ..................... | B27N 7/00 428/192 |
| 2006/0032175 A1 * | 2/2006 | Chen ........................ | B32B 3/04 52/578 |

(Continued)

FOREIGN PATENT DOCUMENTS

| | | |
|---|---|---|
| CN | 103203901 A | 7/2013 |
| CN | 105133818 A | 12/2015 |

(Continued)

OTHER PUBLICATIONS

International Search Report for PCT/EP2016/078010 (3 pages). (Year: 2017).*

(Continued)

*Primary Examiner* — Catherine A. Simone
(74) *Attorney, Agent, or Firm* — Nath, Goldberg & Meyer; Joshua B. Goldberg; Scott H. Blackman (57) ABSTRACT

A panel suitable for constructing a waterproof floor or wall covering is disclosed, wherein the panel has a substantially planar top surface, a substantially planar bottom surface, and at least four substantially linear side edges and further relates to a process for producing the panel and the panel produced by said process.

48 Claims, 1 Drawing Sheet

(51) Int. Cl.
  *B32B 27/32* (2006.01)
  *B32B 27/40* (2006.01)
  *B32B 27/30* (2006.01)

(52) U.S. Cl.
  CPC .............. *B32B 27/32* (2013.01); *B32B 27/40* (2013.01); *B32B 37/04* (2013.01); *B32B 37/153* (2013.01); *E04F 13/077* (2013.01); *E04F 13/0871* (2013.01); *E04F 13/0875* (2013.01); *E04F 15/02183* (2013.01); *E04F 15/02188* (2013.01); *B32B 2471/00* (2013.01)

(58) Field of Classification Search
  CPC .. E04F 13/0875; B32B 2471/00; B32B 27/06; B32B 27/10; B32B 27/08; B32B 27/20; B32B 27/18; B32B 27/304; B32B 27/32; B32B 27/40; B32B 37/153; B32B 37/04
  See application file for complete search history.

(56) References Cited

U.S. PATENT DOCUMENTS

2010/0174027 A1\* 7/2010 Sasaki ..................... C08L 23/02
    524/505
2012/0277365 A1\* 11/2012 Mercier .................. C08L 23/16
    524/426
2015/0059274 A1\* 3/2015 Shaffer .................. B32B 27/08
    52/311.2

FOREIGN PATENT DOCUMENTS

EP          3187664 A1      7/2017
WO    WO-2014024100 A1 *   2/2014
WO    WO-2015170274 A1 *  11/2015

OTHER PUBLICATIONS

European Patent Office action dated Aug. 6, 2019, for corresponding EP application No. 16797914.5.
First Office Action dated Dec. 26, 2019, for corresponding Chinese application 201680083664.6 with English translation.
Wu, P. et al., "Handbook of Plastic Products Production Process", Chemical Industry Press, May 1998, pp. 345-346, 2nd edition; Statement of Relevance attached.
Geng, X. et al.,"Plastics Mixing & Continuous Mixing Equipment", China Light Industry Press, Jan. 2008, pp. 16-21; Statement of Relevance attached.

\* cited by examiner

WATERPROOF PANEL, PROCESS FOR PRODUCING A PANEL, AND PANEL OBTAINABLE BY SAID PROCESS

This is a National Phase Application filed under 35 U.S.C. 371 as a national stage of PCT/EP2016/078010, filed Nov. 17, 2016, an application claiming the benefit of the Netherlands patent Application No. 2016223, filed Feb. 4, 2016, the content of each of which is hereby incorporated by reference in its entirety.

BACKGROUND

The invention relates to a panel suitable for constructing a waterproof floor or wall covering, wherein the panel has a substantially planar top surface, a substantially planar bottom surface, and at least four substantially linear side edges. The invention also relates to a process for producing a panel according to the invention. The invention further relates to a panel obtainable by said process according to the invention.

Such panels are widely known and useful for constructing a waterproof floor or wall covering, and are for instance apparent from the patent publication U.S. Pat. No. 7,763,345. The thermoplastic nature of the panels provides an appropriate barrier to water spillage or damp conditions, and is therefore advantageous. However, these panels, for being based on thermoplastic materials, suffer in practice from allowing an uneven upper surface of the panel caused by irregularities that are present on the surface of the underlying substrate on which the panels are applied. A general requirement of these panels therefore is to develop a panel that is more rigid so that a visible unevenness does no longer occur in practice. At the same time, it is a general requirement that the panel does not suffer from excessive shrinking and expansion due to seasonal and/or local temperature changes, and if possible to improve the panel further in this aspect.

Apart from these requirements there is a general need to simplify the laminate structure by reducing the number of layers, especially avoiding the use of a reinforcement layer and/or an adhesive layer to fix two layers to each other.

SUMMARY

The objective of the present invention is to provide a panel which offers an appropriate solution to one or more of the above requirements and/or general needs.

This objective is achieved according to a first aspect of the invention by the provision of a rigid panel suitable for constructing a waterproof floor, wall, or ceiling covering, wherein the panel has a substantially planar top surface, a substantially planar bottom surface, and at least four substantially linear side edges, wherein the rigid panel has a laminate structure which comprises: a rigid core layer basically composed of a composite material comprising a mixture of mineral material and thermoplastic material, a top layer fixed to the core layer, wherein the composite material contains a ratio of weight percentages of mineral material relative to thermoplastic material which is 1 or larger.

It has been found that such panels have a sufficient rigidity for practical purposes, without the need of a reinforcing layer. Moreover, the waterproof rigid panel according to the invention has, due to the relatively large quantity of mineral material and the relatively low quantity of thermoplastic material in the composite core layer, a significantly improved temperature resistance with respect to conventional floor panel having a core which is predominantly PVC based. Hence, the waterproof panel according to the invention does no longer suffer from excessive shrinking and expansion due to seasonal and/or local temperature changes. The shrinking of the panel is less than 0.1% when tested according to ASTM F 2199 and according to ISO 23999, which is significantly better compared to the shrinking of conventional panels, wherein the shrinkage, measured according to ASTM F 2199 and according to IS023999 is considerable larger than 0.1%, and can even be in the order of magnitude of several percent. Since the panel is waterproof, the panel can be used both indoor and outdoor. Further, the panels, also referred to as planks, are resistant to various chemicals and detergents and, therefore, can even be used in industrial, recreational, or garage environments. For instance, the planks are water resistant such that they will not swell by immersing the material in the water for about 24 hours or longer. The panel according to the invention is rigid, which means that the panel is substantially stiff (dimensionally stable), and hence not flexible (resilient). Here, the modulus of elasticity (MOE) of the panel and/or the core layer, measured according to EN 310, is preferably situated in between 4000 to 10.000 MPa, leading to said relatively rigid panel. Compared to a flexible panel, a rigid panel facilitates installation and is better equipped to bridge slight bumps and undulations in a subfloor without transferring them to the surface. Furthermore, it has been found that the top layer and the core layer can be fixed onto each other over a fusion bonding without the need of an adhesive layer in between.

DETAILED DESCRIPTION OF THE PREFERRED EMBODIMENTS

The mineral filler is preferably particulate mineral filler. Applying a particulate mineral filler may be useful to realise a relatively homogeneous mixture of mineral filler and thermoplastic material, which is commonly in favour of the overall properties of the composite core layer. Preferably, the composite material of the core layer comprises at least 60% by weight of mineral filler. More preferably the core layer comprises between 62 and 70% by weight of mineral filler, more in particular between 64 and 68% by weight of mineral filler. Experimental tests have shown that a minimum of 60% by weight of mineral filler is desirable to improve the rigidity of the core layer as well as to seriously improve the temperature resistance of the core layer. On the other hand, the composite material comprises a maximum of 85% by weight of mineral filler in order to keep the core layer sufficiently stable and coherent, and hence sufficiently reliable and durable. Exceeding this preferred maximum fraction of mineral filler will commonly lead to a (too) brittle and fragile core layer, which is commonly undesired.

Preferably, the composite material comprises at least 15% by weight of thermoplastic material. This lower limit is often sufficient to secure sufficient stability and strength of the core layer. The composite material preferably comprises a maximum of 40% by weight of thermoplastic material. As already indicated above, this maximum is preferred in order to improve the rigidity of the core layer as well as to seriously improve the temperature resistance of the core layer.

In an alternative formulation and for the same arguments as given above, it is preferred in the panel according to the invention, that the mixture contains a ratio of weight percentages of mineral material relative to thermoplastic material, of 1.1 through 2.0, preferably 1.2 through 1.6.

With special preference in the panel according to the invention, the composite material comprises one or more additives chosen from the group consisting of: a pigment, an impact modifier, a lubricant, a stabilizer, a wax, and/or an aid processing agent. Various pigments (inks) may be used, such as e.g. carbon black, red, yellow, white, and green, to impart colour to the composite layer. If applied, pigments are commonly present in an amount of 0-5% by weight in the composite layer. As impact modifier, preferably MBS (Methacrylate-Butadiene-Styrene), CPVC (chlorinated PVC), ABS (acrylonitrile butadiene styrene) or TPE (thermoplastic elastomer) is used, which is more preferably present in an amount of 0-5% by weight in the composite core layer. Also, at least one lubricant is preferably present and more preferably an internal lubricant and an external lubricant. Preferred internal lubricants, which act internally to alter the cohesive forces amongst the thermoplastic polymer chains that results in lower melt viscosity without reducing the strength properties of the resin, are metallic stearates such as calcium and zinc salts of stearic acid. External lubricants, which act externally to prevent resins from sticking to hot metal processing machinery by reducing friction between services, are preferably low-melting paraffins. The stabilizer can be selected for effectiveness with the particular polymer used and may be a calcium zinc stabilizer. A calcium zinc stabilizer containing about 5.5% by weight or more zinc may be used, such as about 6.0% by weight to about 10.0% by weight zinc. Specific non-limiting examples of zinc calcium stabilizers are supplied by Chemson, Inc. under the product codes of PTPI13 (5.8% zinc, 10.5% calcium by weight). Other examples of stabilizers include, but are not limited to, barium-cadmium stabilizers, barium-zinc stabilizers, organotin stabilizers, epoxidized soybean oils, and the like. If applied, the amount of aid processing agent is preferred situated between 1-3% by weight. Preferably, the total amount of additives present in the composite core layer is restricted to 1-15% by weight, more preferably 5-15% by weight, and most preferably 8-12% by weight.

The composite material of the core layer is preferably substantially free of natural organic fibres, in particular cellulose fibres, and more in particular wood (including wood dust, and bamboo dust). Although incorporation of organic fibres, in particular wood fibres and/or wood dust, could be beneficial for special purposes, and hence may be applied, it is usually undesired to incorporate this moisture-sensitive and temperature-sensitive additive into the core in order the maintain sufficient moisture and temperature resistance.

In particular, it is preferred in the panel according to the invention, that the composite material comprises less than 5 wt. % plasticizer, preferably less than 1 wt. % and most preferably virtually no plasticizer. Obviously, a lower amount of plasticizer results in a higher the rigidity of the core layer. Examples of plasticizers which can be used are organic esters of various acids such as phthalic, phosphoric, adipic, sebacic, citric, and the like. More specific examples of possible plasticizers include dioctyl phthalate, dioctyl adipate, dibutyl sebacate, and dinonyl phthalate and glyceryl stearates. However, these commonly used plasticizer are usually environmentally unfriendly, which is an additional reason to not to use any plasticizer in the composite core of the panel according to the invention. In case the addition of a plasticizer would still be desired for some reason, then it is preferred to use bio-derived plasticizers (bioplasticizers), for example plasticizers derived from vegetable oils, and wherein more preferably an epoxy-functional bio-derived plasticizer is used formed by an epoxy-functional fatty acid ester obtained from a vegetable oil selected from the group consisting of soybean oil, canola oil, corn oil, linseed oil, rapeseed oil, safflower oil, sunflower oil, tall oil, tung oil, and mixtures and derivatives thereof. Here, the extent of epoxy functionality helps determine which bioplasticizer should be used and/or how much crosslinking is desired in the crosslinked (or crosslinkable) bioplasticizer Preferably, the rigid core layer comprises at least one mineral material selected from the group consisting of: magnesium oxide, calcium carbonate, chalk, clay, calcium silicate, and talc. These materials have proven to impart a sufficient rigidity to the composite material. As a non-limiting example, limestone (e.g. calcium carbonate with magnesium carbonate) may be used as mineral filler. A specific non-limiting example is dolomitic limestone (which can be screened), such as supplied by Specialty Minerals, Inc. under the product code DF-5025 and having a top mesh size of about 50 and a percent passing a 200 mesh sieve of about 25% by weight. Other mineral fillers that can be used include silicates, or aluminates. As already addressed above, the mineral filler is preferably in the form of particles, also referred to as particulate mineral filler.

Further preferably, in the panel according to the invention, the mixture comprises one or more thermoplastic materials chosen from the group consisting of: PVC, PE, PU, ABS and PP. In one particular example, the thermoplastic polymer that includes, but is not limited to, vinyl containing thermoplastics such as polyvinyl chloride (PVC), polyvinyl acetate (PVA), polyvinyl alcohol (PVOH), and other vinyl and vinylidene resins and copolymers thereof; polyethylenes (PE) such as low density polyethylenes and high density polyethylenes and copolymers thereof; styrenes such as ABS, SAN, and polystyrenes (PS) and copolymers thereof, polypropylene (PP) and copolymers thereof; saturated and unsaturated polyesters; acrylics; polyamides such as nylon containing types; engineering plastics such as acetyl, polycarbonate (PC), polyimide, polysulfone, and polyphenylene oxide and sulfide resins and the like. One or more conductive thermoplastic polymers may be in the composite core, which has applications in conductive flooring and the like. The thermoplastic material may comprise thus any mixture of the aforementioned materials.

The thermoplastic polymer compound to be processed to produce the panel according to the invention can be in powder, liquid, cubed, pelletized form and/or any other extrudable form. Also, the thermoplastic polymer can be virgin, recycled, or a mixture of both. Furthermore, although commonly not desired, the thermoplastic material can be incorporated with a blowing agent(s) or a mechanically injected gas during the extrusion process to make a cellular foam structure core. The thermoplastic material used in the core layer, which can be polyvinyl chloride, can be a suspension grade or mass polymerization grade homopolymer resin having a preferred molecular weight as reflected by an inherent viscosity of from about 0.88 to about 1.0 inherent viscosity. In general, a higher molecular weight polymer is preferred from the standpoint of processing stability and preferably the molecular weight distribution and particle size distribution are narrow in order to provide a good balance between processability and properties. A thermoplastic material used to form the core layer portion can be a PVC powder compound that has good impact strength, ease of processing, high extrusion rate, good surface properties, excellent dimensional stability, and indentation resistance.

In a preferred embodiment of the panel according to the invention, the core layer has a solid structure in which a foam structure, and hence cavities or cells, are virtually absent, and preferably the density of the core layer is from 1500 to 2200 kg/m3, and more preferred from 1900 to 2050 kg/m3. The solid structure, free of a foam structure, further contributes to the desired rigidity of the core layer. Moreover, this solid structure allows the production of relatively thin panels with a thickness of 5 millimetre or less.

In another preferred embodiment of the panel according to the invention, the core layer is an extruded layer formed by an extrusion process or a co-extrusion process. Alternatively, the core layer is made by using a calendaring process. Such an extruded core layer proved advantageous in regard of the rigidity obtained, as well as being capable of forming a fusion bonding with the top layer. Here, the extrusion process and the fusion process can be performed simultaneously during production of the panel.

Preferably, the top layer comprises a laminate of plural layers. A laminated top layer further improves the rigidity of the panel as such. In a preferred embodiment, the laminate of the top layer is a high pressure laminate (HPL) which comprises at least one kraft paper layer. By applying a kraft paper based HPL, the rigidity of the panel as such can be improved significantly. Moreover, kraft paper is heat resistant and does not shrink or expand in case of temperature changes. Since the HPL is commonly firmly attached to the core layer, the temperature stability of the kraft paper based HPL counteracts any (minor) temperature reaction of the core layer, which therefore also leads to an improved temperature stability of the panel as such. Kraft paper is produced from chemical pulp produced in the kraft process (i.e. a process for conversion of wood into wood pulp). Kraft paper is relatively strong and stiff compared to regular paper. Preferably, the weight of the one or more kraft paper layers used is situated in between 50 and 150 g/m$^2$. It is imaginable to stack multiple kraft paper layers on top of each other, wherein it is furthermore imaginable the different kraft paper layers are crossly stacked on top of each other, which leads to a crosswise orientation of cellulose fibres stacked on top of each other, which can further improve the rigidity of the panel. The density of the HPL is preferably situated in between 1.200 and 1.400 kg/m$^3$. The thickness of the HPL is preferably situated in between 0.2 and 1.5 mm, and more preferably situated between 0.3 and 0.6 mm. Although an increased HPL thickness leads to an improved rigidity, it also leads to higher costs. A balance between sufficient rigidity and reasonable costs is typically found in case an HPL thickness of between 0.3 and 0.6 mm is applied. The kraft paper layer(s) is/are preferably impregnated with an adhesive, preferably a thermosetting adhesive, typically a resin. Resin based adhesive which are suitable, are e.g. melamine formaldehyde resins, phenolic resins, and urea formaldehyde. The resin used for the impregnation can be, for example, a mixture of urea formaldehyde and melamine formaldehyde resins. Urea formaldehyde can contribute to the cloudiness of the film that is formed and thus is not preferred for dark colours and the melamine resin imparts transparency, high hardness, scratch resistance, chemical resistance, and good formation, but may have rather high shrinkage values. Combining urea resins with melamine resins in a mixture or using a double impregnation (i.e., applying one resin after another sequentially) provides a positive interaction in controlling shrinkage and reducing cloudiness.

The laminate of the top layer typically comprises at least one base layer, a decorative layer, and a wear layer stacked on top of each other, wherein the base layer preferably comprises at least one kraft paper layer. Preferably, all layers of the top layer laminate are adhesive impregnated layers. The wear layer is preferably formed by a melamine adhesive impregnated transparent paper layer enriched with aluminium oxide particles for improved wear resistance. Here, the paper weight is preferably generally around 30-75 g/m$^2$. The decorative layer is preferably also melamine adhesive impregnated. It is possible to combine the wear layer and the décor layer into a single layer. Here, the paper weight of the decorative layer is preferably generally around 60-100 g/m$^2$.

The primarily function of the HPL top layer is to create a high scratch resistance surface for the finished product flooring. Commonly, the decorative layer and the wear layer are, as such, dimensionally not very stable. By using the base layer, preferably based upon one or more kraft paper layers, the stability and strength of the HPL is increased significantly. This HPL has the characteristic to be nonelastic, not very flexible, and heat and moisture resistant. Typically, the elongation of the HPL shall be less than 1% when tested according to the conventional test procedure ASTM D 638-03 ("Standard Test Method for Tensile Properties of Plastics"). For reference purposes, conventional thermoplastic based top layers have an elongation which varies from 20% to 200%, using the same test procedure.

In the panel according to the invention, it is preferred that the top layer is basically composed of a thermoplastic material layer provided with a decorative pattern at the upper side. A suitable thermoplastic material is a woven vinyl net, which is available on the market, and mainly composed of PVC.

Alternatively, the top layer may comprise at least one ply of cellulose-based layer and a cured resin, wherein the cellulose-based layer is preferably paper, more preferably kraft paper. Such a top layer comprises preferably a multitude of such plies of resin impregnated paper. Said ply of cellulose-based material may also be a veneer layer adhered to a top surface of the core layer. The veneer layer is preferably selected from the group consisting of wood veneer, cork veneer, bamboo veneer, tile veneer, stone veneer, rubber veneer, decorative plastic veneer, linoleum veneer and decorative vinyl veneer.

In a preferred embodiment, the panel comprises a backing layer attached to a bottom side of the core layer, wherein said backing layer preferably comprises a high pressure laminate (HPL). This HPL preferably comprises at least one kraft paper layer, and preferably a plurality of kraft paper layers stacked on top of each other. The application of a backing layer further improves the stiffness (rigidity) of the panel as such, wherein the core layer is sandwiched in between the top layer and the backing layer. More preferably, the core layer is positioned in between the preferably kraft paper based—HPL of the top layer and the—preferably kraft—paper based—HPL of the bottom layer, which leads to an extremely rigid panel. In order to provide the backing layer as such a satisfying rigidity, it is preferred that the thickness of the backing layer is at least 0.7 mm.

According to a special embodiment of the panel according to the invention, it is further preferred that the top layer contains a minor amount of plasticizer which is 5 wt. % or lower.

According to another preferred embodiment of the panel according to the invention, the top layer comprises a further layer fixed to the upper surface of the thermoplastic material layer, which is a protective layer composed of a thermoplastic material with plasticizer. Typically, the plasticizer in the further layer is present in an amount of approx. 20 wt. %.

In the realm of the invention, it is further possible to provide the top layer with a coating as an additional layer at the upper surface of the top layer. Also included in the invention, is the aspect that the upper surface of the top layer has an improved temperature stability which has been obtained by a heat treatment of the upper surface.

It is further preferred in the panel according to invention, that the top layer is an extruded layer formed by an extrusion process. Such a top layer was found to be capable of forming a fusion bonding with the core layer. When the top layer is composed out of multiple layers as indicated above, these layers may be formed individually by extrusion and fused thereafter under pressure or heat, or alternatively, from one extruder by a co-extrusion process and consecutive fusion of layers.

More preferably, in the panel according to the invention, the core layer and the top layer are formed by a co-extrusion process. It is especially preferred in the panel according to the invention, that the core layer and the top layer are fixed to each other by virtue of a fusion bonding which has been formed under heat and pressure.

In another preferred embodiment of the panel according to the invention, it comprises at least one pair, and preferably two pairs, of opposite side edges which are provided with interconnecting coupling means for interconnecting one panel with another. Such panels can be easily connected to each other to construct a wall or floor covering, with or without the need of adhesive or cement to keep the panels in a fixed position to each other. For instance, the interconnecting coupling means may comprise a tongue and a groove wherein the tongue is provided on one side edge of one pair of opposite side edges, and the groove is provided on the other side edge of the same pair of opposite side edges. In addition it is contemplated that the interconnecting coupling means have an interlocking feature which avoids free movement of interconnected panels.

In a second aspect of the invention, a process is provided for producing a panel according to the first aspect of the invention, wherein the core layer and the top layer are fixed to each other in a fusion step wherein heat and pressure are applied to an assembly of the core layer and the top layer, and during which step a fusion bonding is established. The fusion bonding is composed of the contacting surfaces of the core layer and the top layer which have flown to some extent into each other in a melted phase and under the application of pressure. As such, the process does not require an extra step of introducing an adhesive layer between the core and top layer. Furthermore, the fusion bonding was found not to be detrimental to the required rigidity of the core layer.

Preferably, in the process according to the invention, the process is a batch process, or a continuous process. Both processes are feasible for industrial purposes, wherein the continuous process has advantages when used for mass-production of panels.

A continuous process that is particular preferred according to the invention, includes the steps of:
preparing a composite material by mixing of the compounds included in the composite material;
extruding a molten core layer of the composite material using an extruder;
leading the molten core layer over rollers;
providing a top layer and leading the top layer towards an upper surface of the molten core layer wherein the bottom surface of the top layer is applied onto the upper surface of the molten layer to obtain an assembled structure;
applying pressure and heat on the assembled structure, such that a fusion bonding is established between the top layer and the molten core layer;
cooling of the assembled structure after formation of the fusion bonding.

In addition, it is preferred in the process of the invention, that the leading of the molten core layer and/or the leading of the top layer is performed over heated rollers, for instance calendaring rollers. In particular it preferred that the step of applying pressure and heat on the assembled structure is performed at the nip between two heated counter rollers through which the assembled structure is led. Additionally, it is preferred that the above counter roller is provided with a texture so that the upper side of the top layer is embossed with a corresponding texture.

In the realm of the process of the invention, an additional step is performed subsequent to the cooling of the assembled structure, wherein the obtained sheet is cut into pieces which are appropriate to a panel format that is required.

In the preferred continuous process of the invention, the top layer may be provided from a roll as a ready-made product, or alternatively by simultaneous extrusion from a second extruder. In another variant, the continuous process may be based on a co-extrusion process using a co-extruder having two channels for the different materials of core layer and top layer, and which extrudes both layers imultaneously from two separate dies. It is noted that (co-)extrusion of the top layer is only possible when the top layer is basically composed of a thermoplastic material. A top layer containing a ply of a resin impregnated paper layer is not suitable for such an extrusion process.

It has been found that the above processes result in an end product having improved properties such as a satisfactory rigidity of the panel and a sufficient fusion bonding between top layer and core layer. In view of these processes, it appears that the character of the panel is not merely dependent on the choice of materials of the core and top layer, but may also be dependent on the process by which it is made, as they contribute to the final state of the materials in the core and top layer.

Therefore, the invention in a third aspect relates to a panel obtainable by the process according to the second aspect of the invention,
wherein the panel has a substantially planar top surface, and a substantially planar bottom surface, at least four substantially linear side edges, wherein the panel has a laminate structure which comprises:
a core layer basically composed of a composite material comprising a mixture of mineral material and thermoplastic material,
a top layer fixed to the core layer basically composed of a thermoplastic material and/or at least one ply of cellulose-based layer and a cured resin,
wherein the mixture contains a ratio of weight percentages of mineral material relative to thermoplastic material which is 1 or larger,
and wherein the core layer and the top layer are fixed to each other by virtue of a fusion bonding which has been formed under heat and pressure.

Diverse embodiment variants of the invention are described in the non-limitative clauses below:

1. Panel suitable for constructing a waterproof floor or wall covering, wherein the panel has a substantially planar top surface, a substantially planar bottom surface, and at least four substantially linear side edges, wherein the panel has a laminate structure which comprises:
   a core layer basically composed of a composite material comprising a mixture of mineral material and thermoplastic material,
   a top layer fixed to the core layer basically composed of a thermoplastic material and/or at least one ply of cellulose-based layer and a cured resin, characterized in that the mixture contains a ratio of weight percentages of mineral material relative to thermoplastic material which is 1 or larger.

2. Panel according to clause 1, wherein the mineral material comprises, or consists of, magnesium oxide and/or calcium carbonate.

3. Panel according to one of the preceding clauses, wherein the mixture contains a ratio of weight percentages of mineral material relative to thermoplastic material, of 1.1 through 2.0, preferably 1.2 through 1.6.

4. Panel according to one of the preceding clauses, wherein the composite material contains one or more additives chosen from the group consisting of a lubricant, a stabilizer, and a wax, preferably in an amount of 5-15 wt. %, more preferably an amount of 8-12 wt. %.

5. Panel according to one of the preceding clauses, wherein the composite material comprises less than 5 wt. % plasticizer, preferably less than 1 wt. % and most preferably virtually no plasticizer.

6. Panel according to one of the preceding clauses, wherein the mixture comprises one or more thermoplastic materials chosen from the group consisting of: PVC, PE, PU, ABS and PP.

7. Panel according to one of the preceding clauses, wherein the core layer has a solid structure in which cavities or cells are virtually absent, preferably the density of the core layer is from 1500 to 2200 kg/m3, and more preferred from 1900 to 2050 kg/m3.

8. Panel according to one of the preceding clauses, wherein the core layer is an extruded layer formed by an extrusion process or a co-extrusion process.

9. Panel according to one of the preceding clauses, wherein the top layer is basically composed of a thermoplastic material layer provided with a decorative pattern at the upper side, and preferably the thermoplastic material layer comprises a woven vinyl net.

10. Panel according to clause 9, wherein the top layer contains a minor amount of plasticizer which is 5 wt. % or lower.

11. Panel according to clause 9 or 10, wherein the top layer comprises a further layer fixed to the upper surface of the thermoplastic material layer, which is a protective layer composed of a thermoplastic material with plasticizer.

12. Panel according to clause 9-11, wherein the top layer is an extruded layer formed by an extrusion process.

13. Panel according to clause 9-12, wherein the core layer and the top layer are formed by a co-extrusion process.

14. Panel according to one of the preceding clauses, wherein the core layer and the top layer are fixed to each other by virtue of a fusion bonding which has been formed under heat and pressure.

15. Panel according to one of the preceding clauses, comprising at least one pair, and preferably two pairs, of opposite side edges which are provided with interconnecting coupling means for interconnecting one panel with another.

16. Process for producing a panel according to one of the preceding clauses, wherein the core layer and the top layer are fixed to each other in a fusion step wherein heat and pressure are applied to an assembly of the core layer and the top layer, and during which step a fusion bonding is established.

17. Process according to clause 16, wherein the process is a batch process, or a continuous process.

18. Process according to clause 17, wherein the continuous process includes the steps of:
   preparing a composite material by mixing of the compounds included in the composite material;
   extruding a molten core layer of the composite material using an extruder;
   leading the molten core layer over rollers;
   providing a top layer and leading the top layer towards an upper surface of the molten core layer wherein the bottom surface of the top layer is applied onto the upper surface of the molten layer to obtain an assembled structure;
   applying pressure and heat on the assembled structure such that a fusion bonding is established between the top layer and the molten core layer;
   cooling of the assembled structure after formation of the fusion bonding.

19. Panel obtainable by the process according to one of the clauses 16-18, wherein the panel has a substantially planar top surface, and a substantially planar bottom surface, at least four substantially linear side edges,
   wherein the panel has a laminate structure which comprises:
   a core layer basically composed of a composite material comprising a mixture of mineral material and thermoplastic material,
   a top layer fixed to the core layer basically composed of a thermoplastic material and/or at least one ply of cellulose-based layer and a cured resin,
   wherein the mixture contains a ratio of weight percentages of mineral material relative to thermoplastic material which is 1 or larger,
   and wherein the core layer and the top layer are fixed to each other by virtue of a fusion bonding which has been formed under heat and pressure.

20. The panel according to clauses 1-15 and 19, which either
   has a rigidity, expressed as the elasticity modulus of the panel according to EN 310, in the range of 4000 to 10.000 MPa, or
   which has a core layer having a rigidity, expressed as the elasticity modulus of the core layer according to EN 310, in the range of 4000 to 10.000 MPa.

EXAMPLES

The invention will be further explained by the following examples which represents a preferred embodiment of the invention.

Example 1

A laminate structure was formed based on a core layer and a top layer, which top layer is composed of a decorative layer, and a wear layer.

The materials from which each layer is formed, are given in the below table.

| | compound | amount (wt. %) |
|---|---|---|
| Wear layer | PVC | 75 |
| | Plasticizer (oiled based or bio compound) | 20 |
| | Additive | 5 |
| Decorative layer | PVC | 90 |
| | Plasticizer | 5 |
| | Additive | 5 |
| Core layer | Calcium Carbonate | 50-60 |
| | PVC | 30-40 |
| | Additive | 10 |

The additive in all layers is a mixture of a lubricant (internal and external), wax (PE wax for example), stabilizer (for thermal stability), processing aid and pigment.

The wear layer has a thickness of 0.1 to 1 mm, and the decorative layer has a thickness of 0.05 to 0.1 mm. The core layer has a thickness of 2 to 20 mm, preferably from 2.5 to 5 mm.

The panel obtained from the above material, had a rigidity, expressed as the elasticity modulus of the board according to EN 310, of approx. 4000 MPa.

Figure 1:
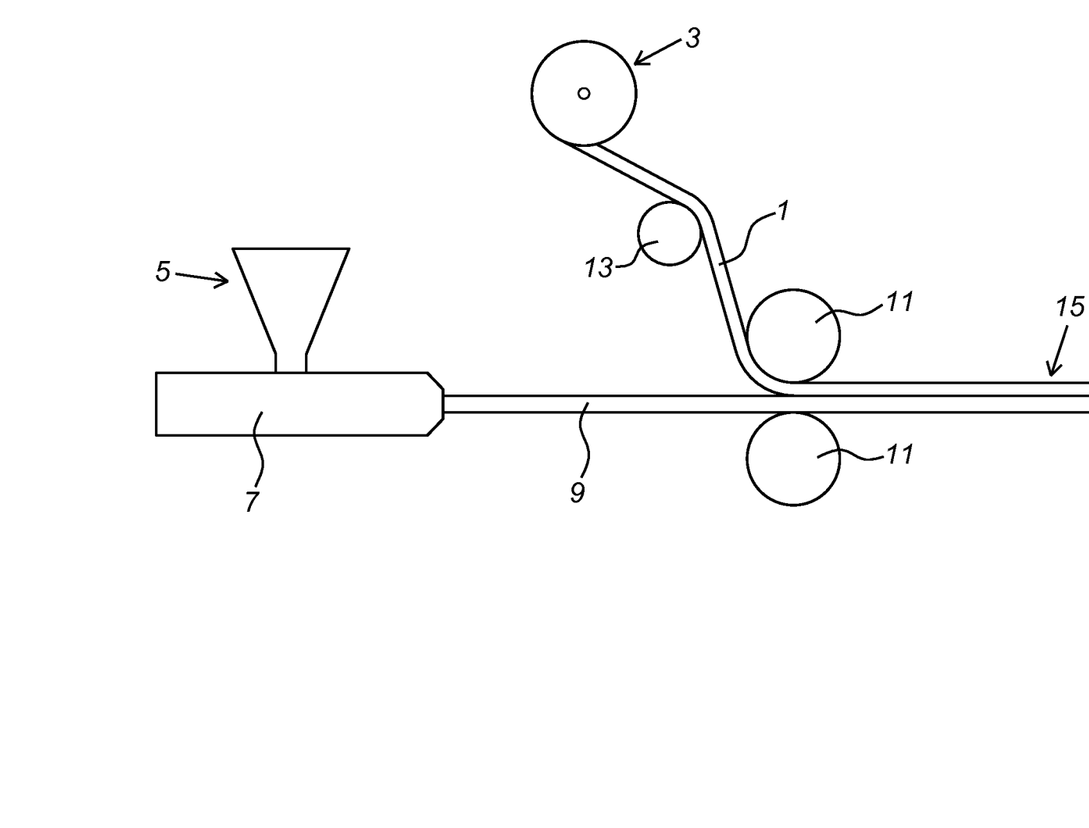
FIG. 1 shows a schematic representation of the process for producing the laminate material for the panel.

The attached FIG. 1 shows schematically the process by which the laminate material for the panel is produced.

The top layer 1 consisting of a wear layer fixed onto a decorative layer that have been fused together in a separate process, is provided on a roll 3.

The compounds included in the composition for the core layer are mixed in a suitable mixer 5 and the obtained raw mixture of material is led into an extruder 7. The extruder expels a melted core layer 9 which is led through two counter rollers 11.

At the nip between the counter rollers 11, the top layer 1 is merged with the melted core layer 9. The melted core layer is hot and flexible at this stage. The top layer 1 is led over a heating roller 13, which pre-heats the top layer 1 before it merges with the core layer 9.

During the passage through the nip of the counter rollers 11, pressure is exerted on the merged structure of top layer and core layer. The counter rollers 11 are heated so that an optimum temperature is assured for the formation of a fusion bonding between the top layer 1 and the core layer 9.

Subsequently, the obtained sheet of laminate material 15 is allowed to cool off, and finally led towards a cutting station (not shown) in which the laminate sheet material is cut into panel pieces.

Optionally, the opposite side edges of the cut panel pieces are furthermore provided with interconnecting coupling means for interconnecting one panel with another.

In Examples 2-4, alternative, exemplary compositions are given, which may also be used in a waterproof panel according to the invention.

Example 2

| | compound | amount (wt. %) |
|---|---|---|
| Wear layer | PVC | 80 |
| | Plasticizer (oiled based or bio compound) | 0 |
| | Additive | 20 |
| Decorative layer | PVC | 90 |
| | Plasticizer | 0 |
| | Additive | 10 |
| Core layer | Calcium Carbonate | 65-70 |
| | PVC | 25-30 |
| | Additive Stabilizer | 2.7-3.1 |
| | MBS | 0.5-1.3 |
| | Wax | 0.5-0.9 |
| | Plasticizer | 0 |
| | Aid processing | 1.2-2.3 |

Example 3

| | Compound | amount (wt. %) |
|---|---|---|
| Wear layer | Paper | 20-40 |
| | Melamine resin | 60-80 |
| Decorative layer | Paper | 40-60 |
| | Melamine resin | 40-60 |
| Sublayer layer | Kraft paper | 40-60 |
| | Melamine resin | 40-60 |
| Core layer | Calcium Carbonate | 65-70 |
| | Plasticizer | 0 |
| | PVC | 25-30 |
| | Additive | 4-7 |

Example 4

| | | Compound | amount (wt. %) |
|---|---|---|---|
| Wear layer | | Paper | 20-40 |
| | | Melamine resin | 60-80 |
| Decorative layer | | Paper | 40-60 |
| | | Melamine resin | 40-60 |
| Sublayer layer | | Kraft paper | 0 |
| | | Melamine resin | 0 |
| Core layer | Sublayer 1 | Wood dust | 40-50 |
| | | PVC | 40-50 |
| | | Additive | 4-7 |
| | Sublayer 2 | Calcium Carbonate | 65-70 |
| | | Plasticizer | 0 |
| | | PVC | 25-30 |
| | | Additive | 4-7 |
| | Sublayer 3 | Wood dust | 40-50 |
| | | PVC | 40-50 |
| | | Additive | 4-7 |

The invention claimed is:

1. A rigid panel suitable for constructing a waterproof floor or wall covering, comprising:
   the panel having a substantially planar top surface, a substantially planar bottom surface, and at least four substantially linear side edges,
   wherein the rigid panel has a laminate structure which comprises:
   a rigid core layer composed of a composite material comprising a mixture of mineral material and thermoplastic material,
   a top layer fixed to the core layer,
   wherein the composite material contains a ratio of weight percentages of mineral material relative to thermoplastic material which is 1 or larger,
   wherein the density of the composite material is between 1500 and 2200 kg/m$^3$, and wherein the panel has a modulus of elasticity, measured according to EN 310, of 4,000 MPa to 10,000 Mpa.

2. The panel according to claim 1, wherein the composite material comprises at least 60% by weight of mineral filler.

3. The panel according claim 2, wherein the composite material comprises a maximum of 85% by weight of mineral filler.

4. The panel according to claim 1, wherein the composite material comprises at least 15% by weight of thermoplastic material.

5. The panel according to claim 4, wherein the composite material comprises a maximum of 40% by weight of thermoplastic material.

6. The panel according to claim 1, wherein the composite material contains a ratio of weight percentages of mineral material relative to thermoplastic material of 1.1 through 2.0.

7. The panel according to claim 6, wherein the composite material contains a ratio of weight percentages of mineral material relative to thermoplastic material of 1.2 through 1.6.

8. The panel according to claim 1, wherein the composite material comprises one or more additives chosen from the group consisting of: a pigment, an impact modifier, a lubricant, a stabilizer, a wax, and/or an aid processing agent.

9. The panel according to claim 8, wherein the composite material comprises 5-15% by weight of one or more additives.

10. The panel according to claim 9, wherein the composite material comprises 8-12% by weight of one or more additives.

11. The panel according to claim 1, wherein the composite material is substantially free of natural organic fibres.

12. The panel according to claim 11, wherein the composite material is substantially free of wood.

13. The panel according to claim 1, wherein the composite material comprises less than 5 wt. % plasticizer.

14. The panel according to claim 13, wherein the composite material comprises less than 1 wt. % plasticizer.

15. The panel according to claim 14, wherein the composite material comprises substantially no plasticizer.

16. The panel according to claim 1, wherein the rigid core layer comprises at least one mineral material selected from the group consisting of magnesium oxide, calcium carbonate, chalk, clay, calcium silicate, and talc.

17. The panel according to claim 1, wherein the composite material comprises one or more thermoplastic materials chosen from the group consisting of PVC, PE, PU, ABS and PP.

18. The panel according to claim 1, wherein the composite material has a solid structure in which cavities or cells, and/or in which a foamed structure, are substantially absent.

19. The panel according to claim 1, wherein the core layer is an extruded layer formed by an extrusion process or a co-extrusion process.

20. The panel according claim 1, wherein the top layer comprises a laminate of plural layers.

21. The panel according to claim 20, wherein the laminate of the top layer is a high pressure laminate (HPL) which comprises at least one kraft paper layer.

22. The panel according to claim 21, wherein the density of the HPL is situated in between 1,200 and 1,400 kg/m³.

23. The panel according to claim 21, wherein the thickness of the HPL is situated in between 0.2 and 1.5 mm.

24. The panel according to claim 21, wherein the weight of the kraft paper layer is situated in between 50 and 150 g/m².

25. The panel according to claim 21, wherein the HPL comprises multiple kraft paper layer stacked on top of each other.

26. The panel according to claim 20, wherein the laminate of the top layer comprises at least one base layer, a decorative layer, and a wear layer stacked on top of each other.

27. The panel according to claim 26, wherein the base layer comprises at least one kraft paper layer.

28. The panel according to claim 20, wherein at least one layer of the top laminate is an adhesive impregnated layer.

29. The panel according to claim 28, wherein all the layers of the top laminate are adhesive impregnated layers.

30. The panel according to claim 1, wherein the top layer is composed of a thermoplastic material and/or at least one ply of cellulose-based layer and a cured resin.

31. The panel according to claim 1, wherein the top layer is composed of a thermoplastic material layer provided with a decorative pattern at the upper side.

32. The panel according to claim 31, wherein the thermoplastic material layer comprises a woven vinyl net.

33. The panel according to claim 31, wherein the top layer contains a minor amount of plasticizer which is 5 wt. % or lower.

34. The panel according to claim 31, wherein the top layer comprises a further layer fixed to the upper surface of the thermoplastic material layer, which is a protective layer composed of a thermoplastic material with plasticizer.

35. The panel according to claim 1, wherein the top layer is an extruded layer formed by an extrusion process.

36. The panel according to claim 1, wherein the core layer and the top layer are formed by a co-extrusion process.

37. The panel according to claim 1, wherein the core layer and the top layer are fixed to each other by virtue of a fusion bonding which has been formed under heat and pressure.

38. The panel according to claim 1, comprising at least one pair of opposite side edges which are provided with interconnecting coupling means for interconnecting one panel with another panel.

39. The panel according to claim 38, comprising at least two pairs of opposite side edges which are provided with interconnecting coupling means for interconnecting one panel with another panel.

40. The panel according to claim 1, wherein the panel comprises a backing layer attached to a bottom side of the core layer, wherein said backing layer comprises a high pressure laminate (HPL) which comprises at least one kraft paper layer.

41. The panel according to claim 40, wherein the thickness of the backing layer is at least 0.7 mm.

42. The panel according to claim 40, wherein the core layer is positioned in between the top layer and the HPL of the backing layer.

43. The panel according to claim 1, wherein the modulus of elasticity of the composite material, measured according to EN 310, is situated in between 4000 to 10,000 MPa.

44. The panel according to claim 1, wherein the density of the composite material is between 1900 and 2050 kg/m³.

45. Process for producing a panel according to claim 1, wherein the core layer and the top layer are fixed to each other in a fusion step wherein heat and pressure are applied to an assembly of the core layer and the top layer, and during which step a fusion bonding is established.

46. Process according to claim 45, wherein the process is a batch process, or a continuous process.

47. Process according to claim 46, wherein the continuous process includes the steps of:

preparing a composite material by mixing of the materials included in the composite material;

extruding a molten core layer of the composite material using an extruder;

leading the molten core layer over rollers;

providing a top layer and leading the top layer towards an upper surface of the molten core layer wherein the bottom surface of the top layer is applied onto the upper surface of the molten layer to obtain an assembled structure;

applying pressure and heat on the assembled structure such that a fusion bonding is established between the top layer and the molten core layer;

cooling of the assembled structure after formation of the fusion bonding.

48. Panel obtainable by the process according to claim 45, wherein the panel has a substantially planar top surface, and a substantially planar bottom surface, at least four substantially linear side edges, wherein the panel has a laminate structure which comprises:
- a core layer composed of a composite material comprising a mixture of mineral material and thermoplastic material,
- a top layer fixed to the core layer composed of a thermoplastic material and/or at least one ply of cellulose-based layer and a cured resin,
- wherein the mixture contains a ratio of weight percentages of mineral material relative to thermoplastic material which is 1 or larger, and
- wherein the core layer and the top layer are fixed to each other by virtue of a fusion bonding which has been formed under heat and pressure.

* * * * *